United States Patent [19]

Breaux

[11] Patent Number: 5,354,149

[45] Date of Patent: * Oct. 11, 1994

[54] IN-GROUND BARRIER SYSTEM WITH PASS-THROUGH

[75] Inventor: Louis B. Breaux, Gretna, La.

[73] Assignee: Barrier Member Containment Corp., Gretna, La.

[*] Notice: The portion of the term of this patent subsequent to Apr. 21, 2009 has been disclaimed.

[21] Appl. No.: 93,524

[22] Filed: Jul. 19, 1993

Related U.S. Application Data

[63] Continuation-in-part of Ser. No. 985,944, Dec. 4, 1992, which is a continuation-in-part of Ser. No. 831,555, Feb. 5, 1992, Pat. No. 5,240,348, which is a continuation of Ser. No. 398,613, Aug. 25, 1989, Pat. No. 5,106,233.

[51] Int. Cl.$^5$ .................... B09B 3/00; C02F 11/12; E02D 27/00
[52] U.S. Cl. .................... 405/128; 405/267; 588/249
[58] Field of Search ............... 405/267, 266, 278, 282, 405/283, 258, 128, 129; 588/249

[56] References Cited

U.S. PATENT DOCUMENTS

| 1,007,718 | 11/1911 | McGill | 405/279 |
|---|---|---|---|
| 1,679,319 | 7/1928 | Marshall . | |
| 1,713,675 | 5/1929 | Parish . | |
| 1,937,758 | 12/1933 | Harris . | |
| 2,101,285 | 12/1937 | Stevens . | |
| 2,355,102 | 8/1944 | Odman . | |
| 2,937,065 | 5/1960 | Harza . | |
| 2,961,731 | 11/1960 | Buzzell et al. . | |
| 3,302,412 | 2/1967 | Hunsucker . | |
| 3,411,305 | 11/1968 | Cella . | |
| 3,465,532 | 9/1969 | Belden . | |
| 3,479,827 | 11/1969 | Morrice . | |
| 3,593,528 | 7/1971 | Pavese | 405/282 |

(List continued on next page.)

FOREIGN PATENT DOCUMENTS 32808 4/1934 Netherlands .

Primary Examiner—Dennis L. Taylor
Attorney, Agent, or Firm—Joseph T. Regard

[57] ABSTRACT

A hazardous waste containment system for preventing the lateral migration of hazardous fluid substances (including both liquid and gas wastes, heavy metals, etc.) into the water table, particularly for sites which are located over a fluid impermeable strata (20) of clay or the like, while also allowing the controlled removal and/or in situ treatment of the fluid substances. The system uses an encircling barrier containment wall (W) comprising a plurality of slidingly engaged, sealed, interlocked, vertical barrier members (501/101) which extend down to and sealingly interface with the underlying fluid impermeable strata. At least one barrier member (1') includes a pass-through (P', FIG. 2) for one or more pipes (900) leading into an adjacent, satellite work/equipment area (E, FIGS. 1 & 3) where the hazardous fluids are controllable removed and treated on-site, and the treated fluids thereafter removed out of the work/equipment area. An installation method for assembling the barrier members in the ground uses a series of guide box assemblies (1-3+), the one (2') for the barrier member having the pass-through likewise having adjacent, pass-through areas (902), which guide box assemblies can be easily assembled and disassembled and which are placed in the excavation fully assembled. The guide box assemblies surrounding the work/equipment area are left in the ground, while the rest are removed during the installation process. Two exemplary guide box assembly embodiments (FIGS. 4 & 9) and two exemplary barrier member embodiments (FIGS. 6/7 & 9), double-wall and single wall, respectively, are disclosed.

10 Claims, 8 Drawing Sheets

U.S. PATENT DOCUMENTS

| | | |
|---|---|---|
| 3,848,855 | 11/1974 | Weiland . |
| 3,864,921 | 2/1975 | Marx et al. . |
| 3,886,705 | 6/1975 | Cornland . |
| 4,059,964 | 11/1977 | Pavese . |
| 4,090,365 | 5/1978 | Nieber . |
| 4,145,891 | 3/1979 | Krings . |
| 4,182,087 | 1/1980 | Schall et al. . |
| 4,194,855 | 3/1980 | Egger . |
| 4,259,028 | 3/1981 | Cook . |
| 4,407,612 | 10/1983 | Van Weele . |
| 4,453,861 | 6/1984 | Bretz et al. . |
| 4,484,835 | 11/1984 | van Klinken . |
| 4,519,729 | 5/1985 | Clarke, Jr. et al. . |
| 4,537,536 | 8/1985 | Tsubonuma et al. . |
| 4,607,981 | 8/1986 | van Klinken . |
| 4,657,442 | 4/1987 | Krings . |
| 4,659,260 | 4/1987 | Morelli . |
| 4,664,560 | 5/1987 | Cortlever . |
| 4,671,705 | 6/1987 | Nussbaumer et al. . |
| 4,673,316 | 6/1987 | Nussbaumer et al. . |
| 4,679,965 | 7/1987 | Glaser et al. . |
| 4,690,588 | 9/1987 | Berger . |
| 4,697,953 | 10/1987 | Nussbaumer et al. . |
| 4,741,644 | 5/1988 | Cavalli et al. . |
| 4,753,551 | 6/1988 | Bruggemann et al. . |
| 4,797,158 | 1/1989 | Harriett . |
| 4,808,039 | 2/1989 | Fischer . |
| 4,909,674 | 3/1990 | Konno et al. . |
| 4,917,543 | 4/1990 | Cole et al. . |
| 4,927,297 | 5/1990 | Simpson . |
| 4,929,126 | 5/1990 | Steenbergen et al. ............... 405/267 |
| 4,933,880 | 2/1991 | Collins . |
| 4,981,394 | 1/1991 | McLaren et al. . |
| 5,013,185 | 5/1991 | Taki . |
| 5,073,066 | 12/1991 | Richland ............................ 405/282 |
| 5,096,334 | 3/1992 | Plank . |
| 5,106,233 | 4/1992 | Breaux . |

IN-GROUND BARRIER SYSTEM WITH PASS-THROUGH

REFERENCE TO THE RELATED APPLICATIONS

This application is a continuation-in-part of: Ser. No. 07/985,944 filed Dec. 4, 1992, entitled "Guide Box Assembly System for In-Ground Barrier Installation", with a co-inventor Lloyd Moffett, which application in turn is a continuation-in-part of patent application Ser. No. 07/831,555 filed Feb. 5, 1992, entitled "Hazardous Waste Containment System", now abandoned which is a continuation of patent application Ser. No. 398,613, filed Aug. 25, 1989 and issued as U.S. Pat. No. 5,106,233 on Apr. 21, 1992, the disclosures of which applications are all incorporated herein by reference.

Applicant with a co-inventor Leonard F. Sansone has also filed a pending application Ser. No. 07/986,241 filed Dec. 4, 1992 entitled "In-Ground Barrier Member Interlocking Joint and Seal System," the disclosure of which is likewise incorporated herein by reference.

TECHNICAL FIELD

The present invention relates principally to hazardous waste containment systems and more particularly to a method for preventing, for example, the migration and leaching of hazardous fluid substances into the water table, including gases such as methane gas and/or heavy metals, using a barrier containment wall and a guide box assembly system for installing the barrier wall components, and more particularly to such a system in which a pass-through is included in the containment wall which allows the controlled removal of materials from the contained area through the pass-through structure contained within the barrier wall.

The present invention teaches the use of an in-ground containment wall comprising a plurality of slidingly engaged, interlocked, vertical barrier members installed in the ground. The barrier members are engaged by means of, preferably, interlocking connectors, which include therein a means for forming a fluid impermeable seal. However, one or more of the barrier members also includes a pass-through structure through which the controlled removal of the contained fluid and other materials can be removed from the contained or restricted area and treated, if so desired, in situ in an adjacent satellite cell or area.

The preferred method for implementing the invention includes the preparation by trenching, auguring or digging, etc., of vertical openings or excavations of prescribed depth, width, and/or diameter in the soil surrounding the areas to be contained, restricted, or protected down preferably to an underlying, impermeable strata; installation of the interconnected, sealed, vertical barrier members to produce the in-ground, sealed, containment or restriction wall therein using a series of guide box assemblies preferably spaced from the side walls of the excavation and having two, spaced wall panels forming an isolated work space for the barrier members between them, at least one of which barrier members includes a lateral pass-through, which preferably also passes through the walls of the guide box assemblies; at least partially filling any open cores of the barrier members and at least partially back-filling the opening between the interior sides of the wall panels themselves and between the outer sides of the wall panels and the sides of the openings or excavations; and ultimately removing at least most of the wall panels of the guide box assemblies, leaving, for example, a series of bottom, anchoring, spreader base plates in the bottom of the openings or excavations into the impermeable strata and underneath the bottoms of the barrier members. If so desired, the barrier member(s) with the pass-through with their respective guide box assemblies are left in the ground for greater structural security and strength for the pass-through sections. Additionally, if so desired, a complete, confined satellite work area or cell can be built adjacent to the containment wall system for protectively providing a work space for the controlled removal and/or treatment of the fluids or other materials in situ removed from the contained area through the pass-throughways with preferably the hazardous containment barrier and the satellite cell sharing a common wall.

The present invention may be used to restrain the lateral migration of a variety of materials, both liquid and gas, while allowing for the controlled removal of fluids and other materials from the contained area, and may be implemented in various soil conditions with similarly successful results.

The system of the present invention provides an efficient and cost effective containment system, with the controlled removal of materials from the contained area, as will be shown infra.

As noted above, the method of installing the present system includes the utilization of a guide box template/anti-caving assembly system for properly aligning the barrier members and providing an open, isolated, work space, particularly where soil conditions are such that there is a likelihood for cave-in.

BACKGROUND ART

As may be determined by a review of the below cited patents, the prior art has failed to contemplate a system as taught in the present invention. Further, the patents cited below are fully distinguishable in construction and use, and are cited only as being at best remotely pertinent to the claimed invention.

A list of prior patents which may be of interest is presented below:

| U.S. PAT. NO. | Patentee(s) | Issue Date |
| --- | --- | --- |
| 2,101,285 | Stevens | 12/07/1937 |
| 2,937,065 | L. Harza | 05/17/1960 |
| 2,961,731 | Buzzell et al | 11/29/1960 |
| 3,202,412 | Hunsucker | 02/07/1967 |
| 3,411,305 | A. Cella | 11/19/1968 |
| 3,848,855 | Weiland | 11/19/1974 |
| 3,886,705 | Cornland | 06/03/1975 |
| 4,808,039 | Fischer | 02/28/1989 |

A cursory review of the above cited patents shows that the prior art is indeed clearly distinguishable from and does not make "obvious" the present invention. Indeed most, if not all, of the cited patents are not part of the prior art of the invention but rather are from disparate, non-analogous arts.

U.S. Pat. No. 2,101,285 teaches a "tubular interlocking piling" of steel having interlocking structures incorporated therewith. The specification teaches the system as being used in the construction or reinforcement of coffer dams, bridge piers and the like. It is noted that the apparatus does not contemplate the utilization of a containment structure, although it does teach implementation as a support wall for above ground construction. Further, unlike the present invention, sealing means for preventing fluid migration is not taught.

U.S. Pat. No. 3,302,412 to Hunsucker teaches "interlocking sheet piles and method of installation", including means to slidingly engage and seal the sheet piles. This system is likewise obviously distinguishable from the present invention, for a variety of reasons. The '412 patent is directed to sheet pilings for forming earthen walls or cofferdams, and is not directed to containment systems, as discussed in the present invention. Further, implementation of the system is impractical, very costly and would be highly unsuitable for use in the types of soil conditions anticipated by the system of the present invention.

For example, the scraper 24 (FIG. 3) is inadequate to remove debris from the cavity 16 while the sheet pile is being driven into the soil. The "scraped" debris would not have anywhere to go, as the tolerance of the shoe and cavity connection is too little to be expected therethrough and the debris could not be pushed through the bottom of the cavity as it is already firmly embedded in packed soil.

While the tolerance of the engagement system is too small to allow scraping of debris therethrough, it is of sufficient tolerance that it allows liberal leakage of a fluid sealant, to the point that it would be impossible to accurately project a fluid impermeable seal on a consistently monitorable basis.

The lugs 30 (FIG. 2) as taught in the '412 patent render the system unworkable in terms of taking away the tolerance necessary for slidingly engaging the panels. The tolerance or gap between the shoe and cavity is needed to allow a smooth installation. Lastly, the construction is overly costly and highly impractical, with the necessity of multiple apertures to be fabricated therein, the alignment of apertures to both cavities, the removal and replacement of the feed tube at each driven pile, and the implementation of scrapers as taught in the specification in the field would be very difficult and time consuming. Thus, even if the system works as taught, it would be usable only with extreme cost and complexity of fabrication.

U.S. Pat. No. 3,886,705 to Cornland teaches a "Hollow Structural Panel of Extruded Plastics Material and a Composite Panel Structure Formed Thereof". The patent teaches a hollow structural panel configured to form partition walls or the like and is designed for resisting deformation due to load bearing. While the '705 patent does teach the utilization of a rubber gasket for preventing leakage of snow, rain, or the like, this apparatus is unsuitable for utilization in conjunction with the system of the present invention. Apparently, the system of the '705 patent would require complete fabrication above ground prior to installation, which would make the system unsuitable for use with the preferred method of the present invention.

U.S. Pat. No. 3,411,305 issued in 1968 to Cella teaches a "Tubular Interlocking Piling for Wall Assemblies". A variation of sheet piling technology, this patent contemplates a system of interlocking piling components in the construction of "cofferdams, walls, dams, piers, abutments, and other types of walls where strong construction is necessary."

The '305 disclosure discloses a "tubular pile unit" of a sufficiently strong material for forming a substantial load bearing wall; it is noted that the disclosure does not teach in any manner a fluid impermeable unit. Consequently, this apparatus is likewise unsuitable for the preferred system contemplated in the present invention. Further, it is noted that load bearing is not a factor in the present invention, for which factor the '305 patent is primarily designed.

U.S. Pat. Nos. 2,937,065 and 2,961,731 disclose fluid impermeable gasket systems fully distinguishable in use, method and apparatus from the present invention.

Not found during the patent search, but known to applicants, is an apparently unpatented method for containing hazardous waste. This present method of preventing the leaching of contaminated fluids frown hazardous waste sites comprises the implementation of a "slurry" wall around the site. A trench is dug to a sufficient depth to contact a fluid impermeable natural earth strata, such as clay.

A problem with preparing such a trench, however, relates to the soils' cohesive strength and its propensity for "caving." This system therefore often has had to resort to expensive sheet pilings to retain and strengthen the trench walls. As the sheet pilings typically were insufficient to prevent seepage of the containment therethrough, a still more expensive medium, typically bentonite, a naturally occurring clay, was used to fill the trench. This slurry would solidify, forming a fluid impermeable subterranean "dam" for containment.

The present invention is anticipated to cost substantially less than the most cost efficient slurry wall system, as it does not require sheet pilings or any other means of preventing "caving" because the present invention provides a series of guide box assemblies that create a temporary, isolated work space for the insertion and joining of the barrier members.

Other material costs of the present system are likewise significantly less, requiring as little as one-one-hundredth (1/100) of the amount of bentonite. It is noted that the bentonite costs fluctuate, but may run as high as two hundred ($200.00) dollars per ton including freight (freight on board) job site.

Likewise, the present invention does not require the utilization of piling equipment, heavy lift equipment, or extensive labor, as is necessary for implementation of the above system. Instead, no piling equipment, and only relatively available lifters and less extensive labor is needed.

Some additional patents are listed below:

| U.S. PAT. NO. | Patentee(s) | Issue Date |
| --- | --- | --- |
| 1,007,718 | J. I. McGill | 11/07/11 |
| 1,713,675 | R. L. Parish | 05/21/29 |
| 1,937,758 | F. R. Harris | 12/05/33 |
| 2,355,102 | O. R. Odman | 08/08/44 |
| 3,302,412 | W. A. Hunsucker | 02/07/67 |
| 3,479,827 | A. R. S. Morrice | 11/25/69 |
| 3,593,528 | J. R. Pavese | 07/20/71 |
| 3,864,921 | Marx et al | 02/11/75 |
| 4,059,964 | Pavese | 11/29/77 |
| 4,090,365 | Nieber | 05/23/78 |
| 4,145,891 | Krings | 03/27/79 |
| 4,194,855 | Egger | 03/25/80 |
| 4,259,028 | Cook | 03/31/81 |
| 4,407,612 | van Weele | 10/04/83 |
| 4,453,861 | Bretz et al | 06/12/84 |
| 4,484,835 | van Klinken | 11/27/84 |
| 4,519,729 | Clarke, Jr. et al | 05/28/85 |
| 4,537,536 | Tsubonuma et al | 08/27/85 |
| 4,607,981 | van Klinken | 08/26/86 |
| 4,657,442 | Krings | 04/14/87 |
| 4,659,260 | Morelli | 04/21/87 |
| 4,664,560 | Cortlever | 05/12/87 |
| 4,671,705 | Nussbaumer et al | 06/09/87 |

| U.S. PAT. NO. | Patentee(s) | Issue Date |
|---|---|---|
| 4,673,316 | Nussbaumer et al | 06/16/87 |
| 4,679,965 | Gläser et al | 07/14/87 |
| 4,697,953 | Nussbaumer et al | 10/06/87 |
| 4,741,644 | Cavalli et al | 05/03/88 |
| 4,753,551 | Brueggemann et al | 06/28/88 |
| 4,797,158 | Harriett | 01/10/89 |
| 4,808,039 | Fischer | 02/28/89 |
| 4,909,674 | Konno et al | 03/20/90 |
| 4,917,543 | Cole et al | 04/17/90 |
| 4,927,297 | Simpson | 05/22/90 |
| 4,929,126 | Steenbergen et al | 05/29/90 |
| 4,981,394 | McLaren et al | 01/01/91 |
| 4,993,880 | Collins | 02/19/91 |
| 5,013,185 | Taki | 05/07/91 |
| 5,096,334 | Plank | 03/27/92 |

The '718, '675, '758, '412, '039, '543 and '394 patents are considered to be more pertinent to the sealing aspects of the preferred embodiment(s); the '827, '528, '921, '964, '365, '891, '028, '442, '260 and '334 patents are directed to various types of "trench boxes;" the '855, '612, '835, '861, '729, '536, '981, '705, '316, '965, '953, '644, '551, '158, '039, '297, '126, '880 and '185 patents are considered to be more pertinent to the over-all system of the invention; while the '102, '412 and '126 patents are considered to be more pertinent to various profiles used in various types of male/female joints used in a number of different items, some non-analogous to the present invention and all of which are significantly different from those used in the present invention, particularly those used in the interconnecting joints between the barrier members of the present invention.

With regard to "trench boxes", the prior art has contemplated numerous configurations for trench wall shoring devices and the like for preventing excavation cave-in, as evidenced by the sampling of patents noted above.

For example, U.S. Pat. No. 4,659,260 issued in 1987 for a "Trench Box" discloses a system to prevent the caving in of an excavated area, providing a reinforced shoring system. However, the guide box assembly of the present invention, which contemplates a slotted mechanism specifically configured for installing the barrier containment members of the present invention, teaches a mechanical installation system fully distinguishable from the '260 patent.

U.S. Pat. No. 4,090,364 to Nieber discloses a "Portal Frame for Trench Box Stack" wherein there is provided an easily assembled and disassembled system, but which nonetheless does not teach nor contemplate the mechanical aspects or template system or methodology of the present invention.

U.S. Pat. No. 4,059,964 issued in 1977 discloses an opposed, support wall system for the installation of trench wall sheeting in side open areas in the wall system, which are positioned against the side walls of the excavation in which the trench wall sheeting is being installed. This system, while pertinent, is nonetheless fully distinguishable from the present system, as it does not teach nor contemplate the mechanical interrelationship or methodology of the present invention.

The other patents noted are likewise distinguishable from the present invention but are included to illustrate the state of the art. In summation, the guide box assembly system of the present invention does have substantial novelty with regard to the known trench box art above, especially with regard to the mechanical aspects of the invention as utilized in the installation of the barrier member containment system of the invention.

Most of the patents noted as being pertinent to the over-all system of the invention teach or contemplate a system for containing or preventing the lateral migration of fluids through the soil via fluid impermeable fabric or plastic sheeting subterranean structures or the like.

These patents typically rely upon a bentonite slurry or similar liquid means of preventing the caving in of the excavated area, and are thereby much more expensive to install when compared to the present invention. Further, these systems are distinguishable in their interlocking means for the various barrier members, which include systems which do not even contemplate a sealed connection along the various joined members, substantially reducing, if not eliminating, any reliable containment of toxic fluid wastes.

U.S. Pat. No. 4,679,965 to Gläser et al entitled a "Method and Apparatus for Installing Panels into Recesses in the Ground" discloses a containment system wherein a trench is excavated and filled with the slurry, and large high density polyethylene (HDPE) sheets are engaged through slotted arrangements in the trench to form a barrier. This system is distinguishable from the present system, as it utilizes a different profile, no seal, and no guide box assembly in the installation.

The noted patents further include unusual devices for excavating areas for the installation of containment systems, such as, for example, U.S. Pat. No. 5,013,185, issued in 1985 to Osamu Taki for a "Multi-Shaft Auger Apparatus and Process for Fixation of Soils Containing Toxic Wastes", as well as other similar excavation systems. For another multi-auger apparatus, note U.S. Pat. No. 4,537,536 to Tsubonuma et al for a "Process and Apparatus of Constructing a Water Tight Underground Pile Wall".

For a solid barrier containment system, see U.S. Pat. No. 4,407,612 to van Weele, which discloses a partially load bearing wall comprised of curved concrete shell members, connected via spreader joints. This patent is readily distinguishable from the present invention, as it teaches a totally different structure, operation, and installation from the present invention.

U.S. Pat. No. 4,453,861 to Bretz et al teaches an in situ system for pouring concrete to form barrier containment walls and is likewise readily distinguishable from the present invention.

With regard to the noted seal and the male/female profile patents, there is included various sealing means for panel members and other pertinent systems. For example, Cortlever U.S. Pat. No. 4,664,560 issued in 1987 teaches a subterranean containment system wherein there is provided (note FIG. 3) a heat activated seal for preventing the lateral migration of liquid therethrough. The system as taught is clearly distinguishable from a patentability standpoint.

U.S. Pat. No. 4,917,543 issued in 1990 teaches a "Wall System Employing Extruded Panel Sections" wherein there is taught a connector element (25) which may also act to seal the various installed panels. Again, however, this system is distinguishable from the present invention.

U.S. Pat. No. 3,302,412 issued in 1967 discloses a lug member 30 (note FIG. 2) configured to space the sheet piling into a proper interlocking installation. Also taught is the disposition of a sealant (36, FIG. 7) for preventing leakage of the system. Again, however, this is still just another profile and seal means which is clearly distinguishable from the present invention.

The Simpson '297 patent forms an impermeable barrier in an excavation made down to bedrock to contain waste materials in the ground, in which a sheet of impervious material, such as a fabric carrying a substantially dehydrated sodium-bentonite clay, is placed along the side walls of the excavation, and the rest of the excavation is then filled with concrete.

The van Klinken '835 & '981 patents are directed to waste containment systems in which "more or less flexible sheets or foils" are introduced into the soil by means of a "lance."

In the Nussbaumer et al '953 patent a fluid sealing material is introduced through pipes into the ground which thereafter solidifies, sealing the wastes in a dump. The Brueggemann et al patent likewise uses a piping system to provide "a sealing screen for waste dumps." The Nussbaumer et al '316 patent uses slotted wall connections which must be flushed out prior to using plastic foil sealing elements for sealing two adjacent barrier wall sections.

In the Cavalli '644 patent initially vertical coupling members are formed in spaced bore holes in the ground, with the space between them excavated, and then a sandwich of high density polyethylene sheets with an internal mesh is connected between the coupling members, forming an "environmental cut-off and drain." In the Clarke et al '729 patent a trench is made and a series of membrane fluid barriers are placed in it suspended between slotted end connectors.

The Konno et al '674 patent forms "an underground continuous water-impervious wall" by rolling out an impervious sheet of material into a trench and charging a hardening material against the opposite side surfaces of the impervious sheet and allowing the material to harden. In the Steenbergen et al patent a screen of flexible material is fed into a trench typically in a folded over fashion, with the top of the fold being held up by appropriate means in the unfilled trench.

The Cortlever '560 patent, referred to above in connection with seals, also discloses the use of dam wall sheets (1) of stainless steel or of a synthetic resin which are sequentially inserted into the ground using an enclosing, vibrating, injection guide (19) aided by earth loosening water jets (29), with one sheet being vertically engaged with the preceding dam sheet via male/female edge joints which are slid together. After one dam sheet is inserted into the ground, the vibratory injection guide is withdrawn to then be used for the next dam sheet.

The presence of all of these diverse, attempted 37 solutions" of the past to the challenge of forming an impermeable barrier about a waste area to be contained and the prior existence for many years of the various means used in the present invention to successfully meet this challenge provide further objective indicia or evidence of the "unobviousness" and patentability of the invention. In the parent application with co-inventor Moffett Ser. No. 07/985,944, the examiner has cited the additional references listed below:

| U.S. PAT. NO. | Patentee(s) | Issue Date |
|---|---|---|
| 4,690,588 | Berger | 09/87 |
| 4,990,210 | Glaser et al | 02/91 |
| 5,106,233 | Breaux | 04/92 |

-continued

| U.S. PAT. NO. | Patentee(s) | Issue Date |
|---|---|---|
| 5,163,785 | Zanelli et al | 11/92 |

In the related application with co-inventor Sansone Ser. No. 07/986,241, the examiner has cited the additional references listed below:

| Patent No. | Patentee(s) | Issue Date |
|---|---|---|
| 1,679,319 | Marshall | 07/28 |
| 3,465,532 | Belden | 09/69 |
| 4,182,087 | Schall et al | 01/80 |
| 4,690,588 | Berger | 19/87 |
| 5,106,233 | Breaux | 04/92 |
| 32,808 | Netherlands | 1934 |

However, none of these references, it is believed, add any significant disclosures with respect to the invention hereof not already discussed above, with the Breaux patent being one of the predecessor cases hereto, and both applications have been acknowledged to be directed to allowable inventions by their respective examiners.

GENERAL DISCUSSION OF INVENTION

The present invention overcomes the problems of the prior art by providing a barrier wall installation system which is reliable, relatively economical and less hazardous, which not only isolates and confines or restricts a contaminated area but also allows the controlled removal of fluids and other materials, including heavy metals.

As may be noted from the above, the prior art has not provided a relatively inexpensive yet consistently impermeable, readily implemented containment system for preventing the leaching of toxic materials from dump sites and the like. However, such is achieved in the present invention, and the exemplary embodiments of the present system comprise the utilization of a plurality of barrier members, each barrier member having a tubular or double-wall body or, alternatively, a single wall structure, with edge appendages on the opposite or complementary ends of the barrier member, with the barrier members being installed and interconnected in a protected, open work space provided by a series of interconnected guide box assemblies. At least one of the barrier members includes a pass-through, through which fluids or other materials can be removed under controlled circumstances from the contained area. Such a contained area can be provided by building a completely surrounding barrier wall, surrounding the area 360°, or by building an appropriate restriction wall of less than 360° coverage which effectively contains the restricted area, taking into account the direction(s) of flow of the contaminated fluids or materials.

The barrier member appendages are of a "male" and "female" type, respectively, and are configured to slidingly engage and lockingly interconnect juxtaposed barrier members in a vertical fashion.

Further, the appendages are configured with each to include a fluid impermeable seal between the associated appendages of the interconnected barrier members.

It is noted that the appendages are not limited to a hundred and eighty (180°) degree separation and nay be implemented in a variety of circumferentially located positions relative to one another. For example, a ninety (90°) degree separation would be used for a ninety degree "corner" barrier member, while a variety of other degree separations could be utilized to form, for example, a "kidney" configured containment area. Other degree separations may be utilized for forming still other geometric containment configurations. Thus, the containment system need not necessarily form a circle or rectangle, and may be configured to contain any desired layout. It is noted that the engagement appendages for all configuration barrier members are designed to mate with the opposite appendages of other members of this invention.

The present invention of providing a vertical wall as a containment barrier is possible as the wall is installed down to a depth to intersect with, for example, an underlying clay strata in the soil, a fluid impermeable strata found at varying depths. Thus, various sites require different depths of implementation utilizing differing member lengths. Normally it is not necessary to go deeper than forty (40') feet, and, thus, conventional excavation equipment typically may be used in the present system. It is noted that clay is not the only fluid impermeable strata, and the present system may be used in conjunction with other fluid impermeable strata as well, such as, for further example, bedrock, with satisfactory results.

Another step, when desirable, in the installation method of the present invention, is the implementation of a sealing media to embed the base of the containment wall to prevent leaching thereunder. The exemplary embodiment of this step utilizes, when desirable, the naturally occurring clay bentonite as taught in the slurry wall concept for the base sealant, but in far less amounts. The base sealant need be implemented only in an amount sufficient to embed the bottom intersection of the wall and the strata. This may be, for example, four (4") or more inches, and more typically twelve or eighteen (12" or 18") inches. It is also noted that, in some situations, this step may not be necessary.

For installation of the present invention particularly in soil conditions having a likelihood of "caving", the present invention teaches the implementation of a "guide box" template or guide box assembly system, into which the barrier members are placed and interconnected, extending the full depth and ultimately the full length of the excavation. The "guide box" serves at least five purposes, namely: (1) it provides an outer support structure which prevents any caving walls of the excavation from entering the area where the members are to be installed, lessening the likelihood of complications during engagement of the barrier members; (2) it provides a template for easy engagement and proper alignment of the barrier members during installation; (3) it provides protection for previously installed members against damage from the auger (when an augured hole is desirable); (4) it can act as a guide for the auger, if auguring is used; and (5) it can allow for gradual and controlled back-filling by being slowly extracted from the excavation, if so desired. However, the first two purposes are the primary purposes of the guide box assemblies of the invention.

Each guide box assembly typically includes two, spaced wall panels providing the protected, open work space for the barrier member installation between them, which wall panels can be easily assembled into a rigid unit by means of a series of laterally extending, top and bottom spreader bars. The lower or bottom spreader bars, which preferably can also serve as anchors for the guide box assemblies and bases for the barrier members, are easily detached and left down in the ground when the wall panels are removed from the excavation. This is achieved by the use of a series of vertical, parallel, guide shafts extending through the full height of the wall panels, connected at their tops to the top of their respective wall panels and temporarily connected at their bottoms to the anchoring spreader bars by means of rotatable interconnections, which can be easily reversed to detach the bottom spreader bars from the wall panels.

At least one of the guide box assemblies also preferably includes pass-through areas, through which access to the pass-through in the guide box's associated barrier member is possible. A typical, completed pass-through will include one or more pipe sections feeding through or otherwise communicating with, for example, an integral, flanged pass-through in the barrier member. The guide box assembly with its pass-through areas is preferably left "permanently" in the ground, rather than removed like the other guide box assemblies. The leaving in the ground of the pass-through guide box assembly helps to strengthen and secure the pass-through of the associated barrier member. However, after the site has been processed and cleaned up and the pass-throughs and barrier walls are no longer needed, they likewise can then be removed, if so desired, returning the site to its natural state.

The present system contemplates excavation of the ground soil via trenching or auguring, but expressly teaches that other methods of excavation may be utilized with satisfactory results.

It is therefore an object of the present invention to provide a system for containing hazardous wastes, which is efficient, utilitarian, and cost effective, and which provides reliable protection against the threat of migrating contamination of adjacent aquifers and soil and also allows the controlled removal or treatment of contaminated material from the contained or restricted area.

It is a further object of the present invention to provide a system for containing hazardous wastes, which utilizes a plurality of slidingly engaged interlocking containment members which are installed in a protected, open work space provided by a series of interconnected guide box assemblies, at least one of which preferably includes co-operative pass-through areas.

It is a still further object of the present invention to provide a system for containing hazardous wastes that is adaptable to a variety of dump site configurations It is another object of the present invention to provide a system for containing hazardous wastes which provides reliable containment for a period of time equal to or exceeding conventional methods, while still allowing the controlled removal and/or treatment of the wastes.

It is another object of the present invention to provide a system for containing hazardous wastes while allowing the wastes to be removed or neutralized or treated in situ, as desired.

It is a further object of the present invention to provide a method of installing a hazardous waste containment system utilizing a plurality of vertical barrier members, wherein the method includes the utilization of a "guide box" template or assembly which aids in the installation process, in which at least one of the barrier members includes an integral pass-through for one or more pipes for the controlled removal of, for example, heavy metals, or treatment of the hazardous wastes on site.

It is still a further object to provide a protected satellite area or cell adjacent to the contained area for use as an on-going work and equipment area for equipment and the like to remove by pumping or suctioning the hazardous materials from the contained hazardous waste area and, if so desired, at least preliminarily treating the waste materials on-site in the satellite area.

It is a further corollary object to build such a protected satellite area or cell using the same or similar types of guide box assemblies and barrier members and associated methodology as used to build the containment or restriction system.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein:

FIG. 5 is a perspective view of an initial set of two guide box assemblies (of the type shown in FIG. 4) being installed in the ground to start the in-place formation of the containment wall, with the second guide box assembly being interconnected to the initial guide box assembly having a barrier member positioned within it, as the former is being lowered into a trench formed in the ground adjacent to the initial guide box assembly; while

EXEMPLARY MODE FOR CARRYING OUT THE INVENTION

PASS-THROUGH CONTAINMENT (FIGS. 1–3)

Figure 1:
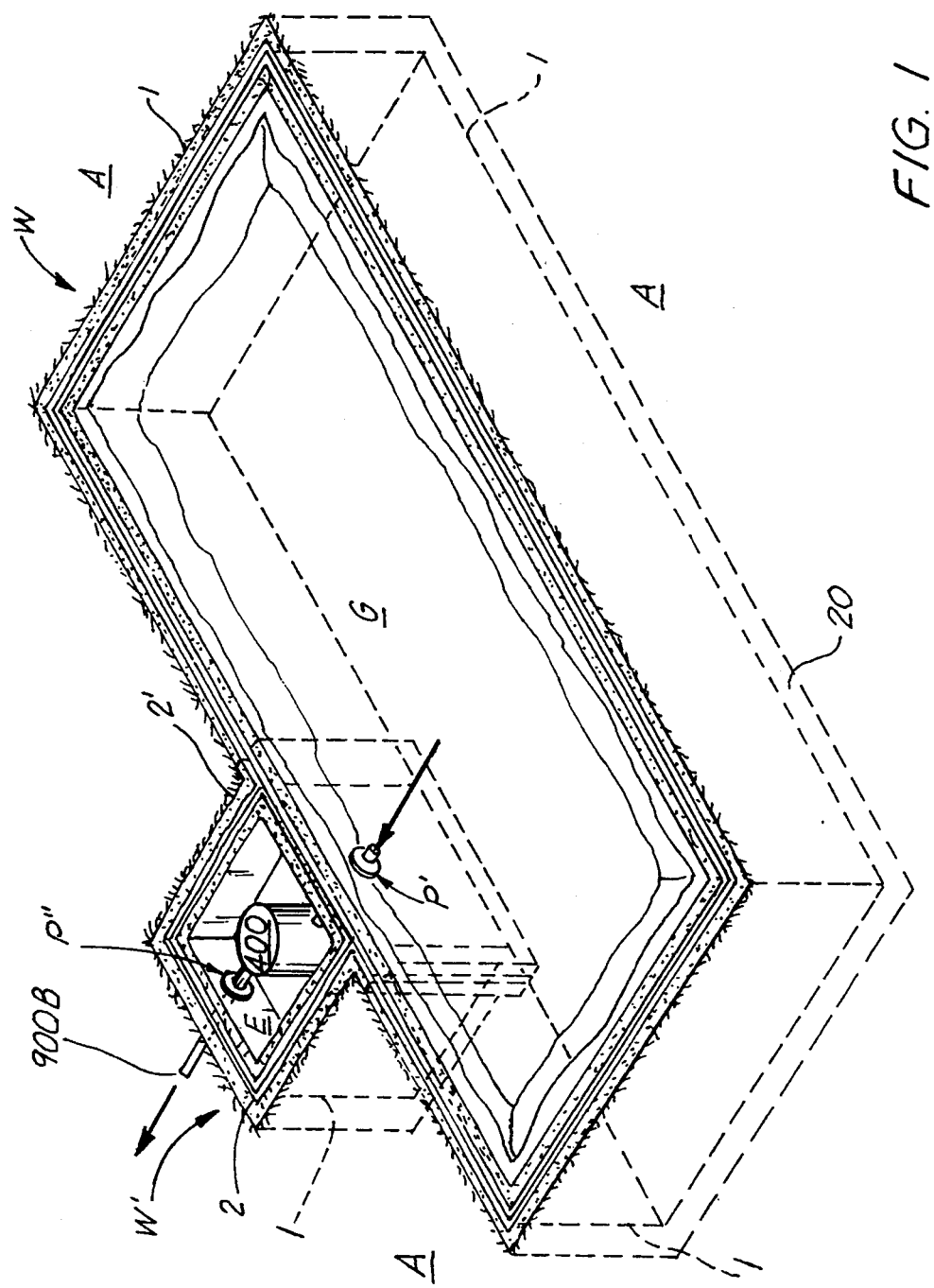
FIG. 1 is a perspective, generalized or simplified view of an exemplary, completed, in-ground barrier containment wall system, comprised of a series of vertically disposed or arrayed, edge-to-edge interconnected barrier members of a suitable type with which the present invention can be used, with an adjacent satellite work and equipment area or cell defined by a series of edge-to-edge interconnected barrier members with associated guide box assemblies left in place in the ground, with a first pass-through being provided between the confined waste area and the adjacent work/equipment area and a second pass-through being provided between the work/equipment area and the outside, non-confined area.
Figure 3:
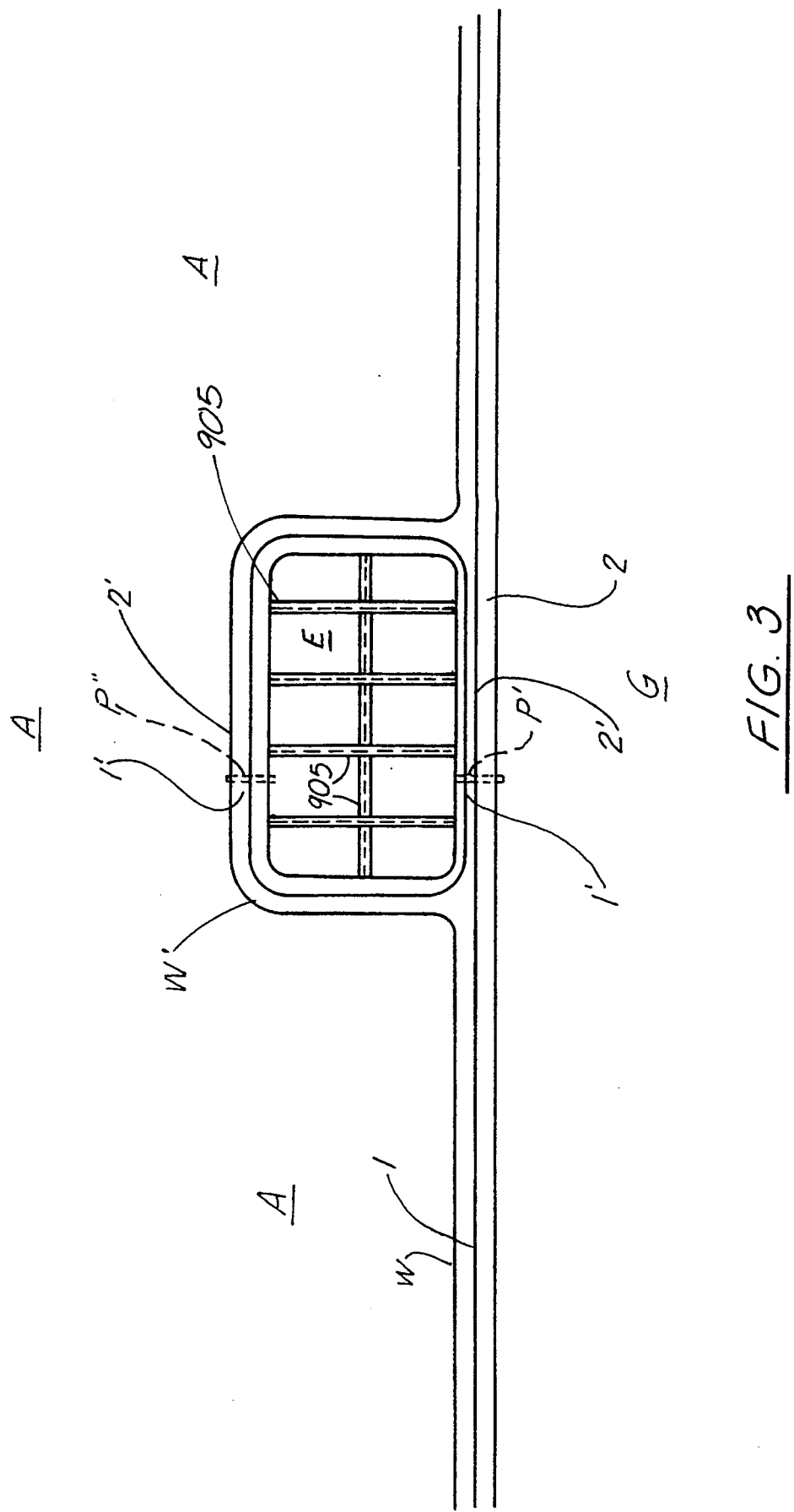
FIG. 3 is a plan, close-up view of an adjacent satellite work/equipment area similar to that illustrated in FIG. 1 but further illustrating the inclusion of a series of spreader beams to solidify the surrounding walls.

An exemplary embodiment and application of the in-ground barrier system with the pass-through features of the present invention is illustrated in FIGS. 1 & 3.

As can be seen in these figures and using the exemplary guide box assemblies and the barrier members of the present invention and installation methodology of the invention (described in detail in the following sections in connection with FIGS. 4+), a confined, contaminated area G, which includes typically a hazardous waste area containing, for example, heavy metals, toxic fluids and other substances, is created within the confines of the interconnected barrier members 1. These barrier members 1 are installed down into the ground, isolating the contaminated area G from the surrounding areas A.

The barrier members 1 preferably extend down to and sealingly interface with an impervious, underlying layer or substrata 20 of clay or the like. In some areas it may be desirable or necessary to have the barrier members 1 extend down to a depth that may not have an impervious substrata.

Adjacent to the walled, confined area G is a confined, dug-out, work and equipment area or cell E, which contains within its walls W' pumping and hazardous waste processing equipment 400. The equipment 400 can be either portable or permanently installed equipment used for, for example, the in situ treatment of contaminated material contained within the area G.

Figure 2:
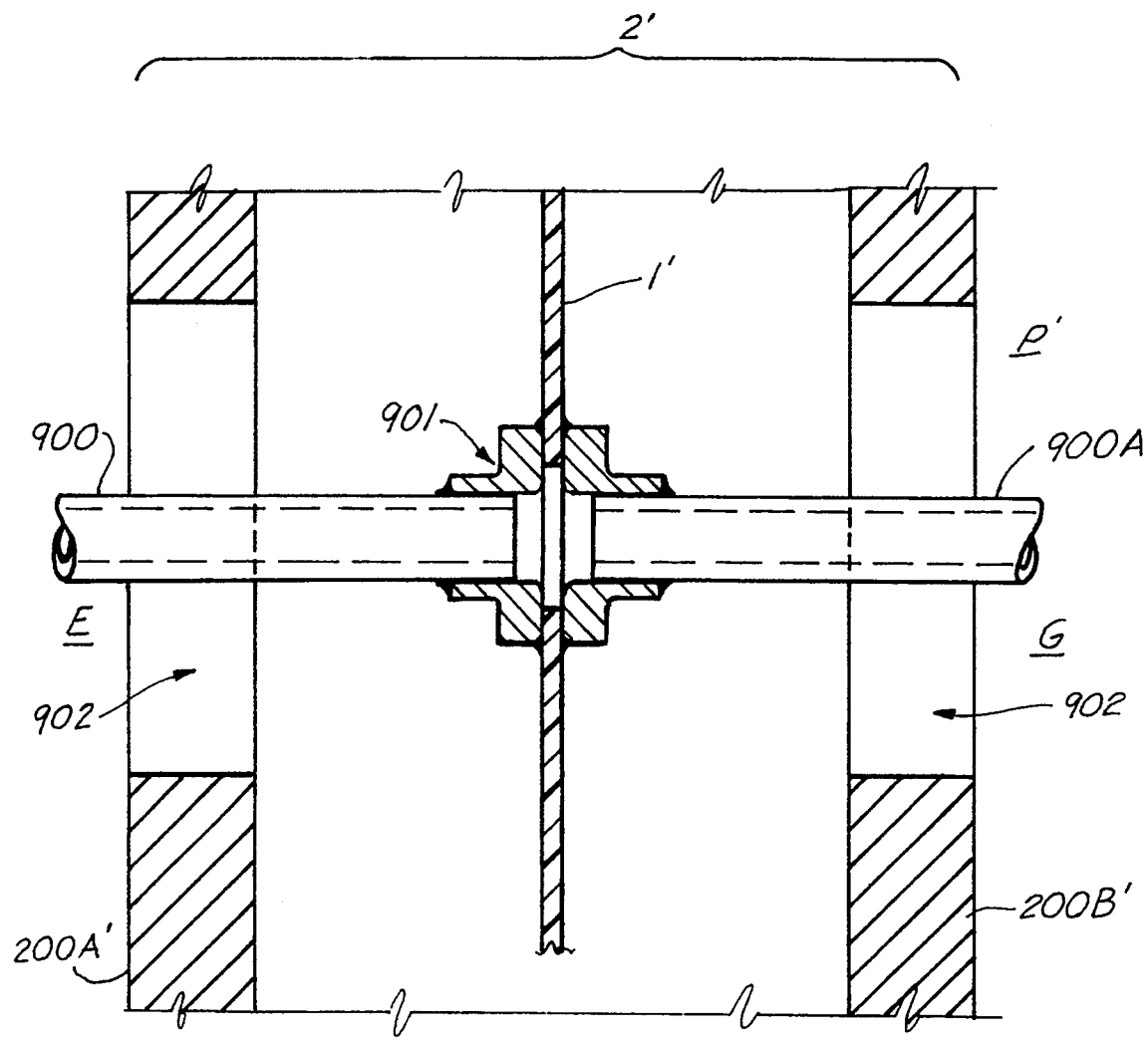
FIG. 2 is a side, cross-sectional, detail view of an exemplary pass-through structure, of the type which can be used in the application illustrated in FIG. 1, integrated into a single wall type barrier member with open areas being provided in the adjacent guide box assembly walls, which allow access to the pass-through in the barrier member.

An initial, entry pass-through P' is included through a special barrier member 1' and a special associated guide box assembly 2' extending from the confined contaminated area G into the work/equipment area or cell E. As can also be seen in FIG. 2, the pass-through P' includes easily connected pipe sections 900, which pass through the special barrier member 1' by means of a flanged fitting 901 fused to the barrier member. Sealed connections are used between the flanged connection 901, pipe sections 900 and the main wall of the barrier member 1' so that the flow of contaminated fluids through the barrier member 1' is controlled and not unrestricted.

During the manufacture of the guide box, access holes 902, forming pass-through areas, are provided in the wall panels 200A' & 200B' of the special guide box assembly 2' in the areas adjacent to the pass-through P' in the special barrier member 1'. The pass-through areas 200A & 200B can be produced by, for example, pre-drilling or cutting a series of holes in the wall panels of the guide box. The holes can be, if so desired, outfitted with appropriate piping, hardware and seals to allow the fluids to freely flow under control through the installed piping directly into the manifold or opening of the in situ processing plan 400, or be merely open areas as illustrated. The illustrated, open pass-through areas allow access to the fitting 901 in order to connect the pipe sections 900 to the fitting after the guide box assembly 2' and its associated special barrier member 1' are installed in the ground.

Unlike most, if not all, of the other guide box assemblies 2, the special guide box assembly 2' is left in the ground after the barrier wall W is completed. This provides additional security and strength for the special barrier members 1' and its pass-through P'.

A second, exit pass-through P" is included through a like special barrier member 1' and a like special associated guide box assembly 2' extending from the work-/equipment area E out to the surrounding area A. This provides an exit line for the discharge of, for example, clear, cleaned processed fluids from the processing and treatment equipment 400. If so desired, this exit line, carrying cleaned up fluids and not e.g. toxic contaminants, can merely exit directly into the surrounding ground area A below the surface.

Thus, the pipe sections 900 extend initially from the contaminated area G at entry pipe 900A through the first pass-through P' into the work/equipment area E to the processing and treatment equipment 400 and from there out to the outside area A through the second pass-through P" at exit or discharge pipe section 900B.

In addition to the special guide box assemblies 2', which include the special pass-throughways P' & P", the guide box assemblies 2 which surround the plant area E are also preferably left in the ground after the walls W & W' have been completely formed. As can be seen in FIGS. 1 & 3, the two, encircled, adjacent areas G & E share a common barrier wall with the initial pass-through P' being located in the common barrier wall. The presence of the guide boxes provides supporting walls surrounding the work/equipment area after the area has been excavated or dug out, resulting in an open but confined, protected and sealed work area.

As can also be seen in FIG. 3, a set of criss-crossing spreader beams 905 can be included at the bottom of the dug-out work/equipment area E to prevent any inward movement of the guide boxes 2 after the chamber E has been evacuated. These beams 905 would be preferably installed prior to the total excavation of the work-/equipment chamber E and can be attached to special pockets at the base of the guide box wall panels provided for this purpose in guide box assemblies designed to be used for this purpose or application.

Additional support beams can be provided across opposed guide box wall panels 200A, 200B at levels higher than the floor or base of the work/equipment area E, if so desired. Likewise a partial or complete roof could be erected over the area E, if so desired, for protection of the workers and equipment from the weather.

The detail structure of exemplary barrier members and guide box assemblies and their installation methodology will be discussed below.

However, it should be understood that, rather than the containment wall W completely surrounding or going completely around the contaminated area G three hundred sixty (360°) degrees, a contaminated area can be effectively contained by a barrier wall which covers much less than 360° going only partially around it, taking into account the natural direction(s) of flow or migration of the contaminants. Additionally, rather than a straight or flat barrier surface around the pass-through area (P), the wall in that area could be effectively curved in the lateral direction leading into the initial pass-through, in essence funneling the contaminants to the pass-through.

STRUCTURE OF INITIAL GUIDE BOX ASSEMBLY (FIGS. 4+)

Figure 4:
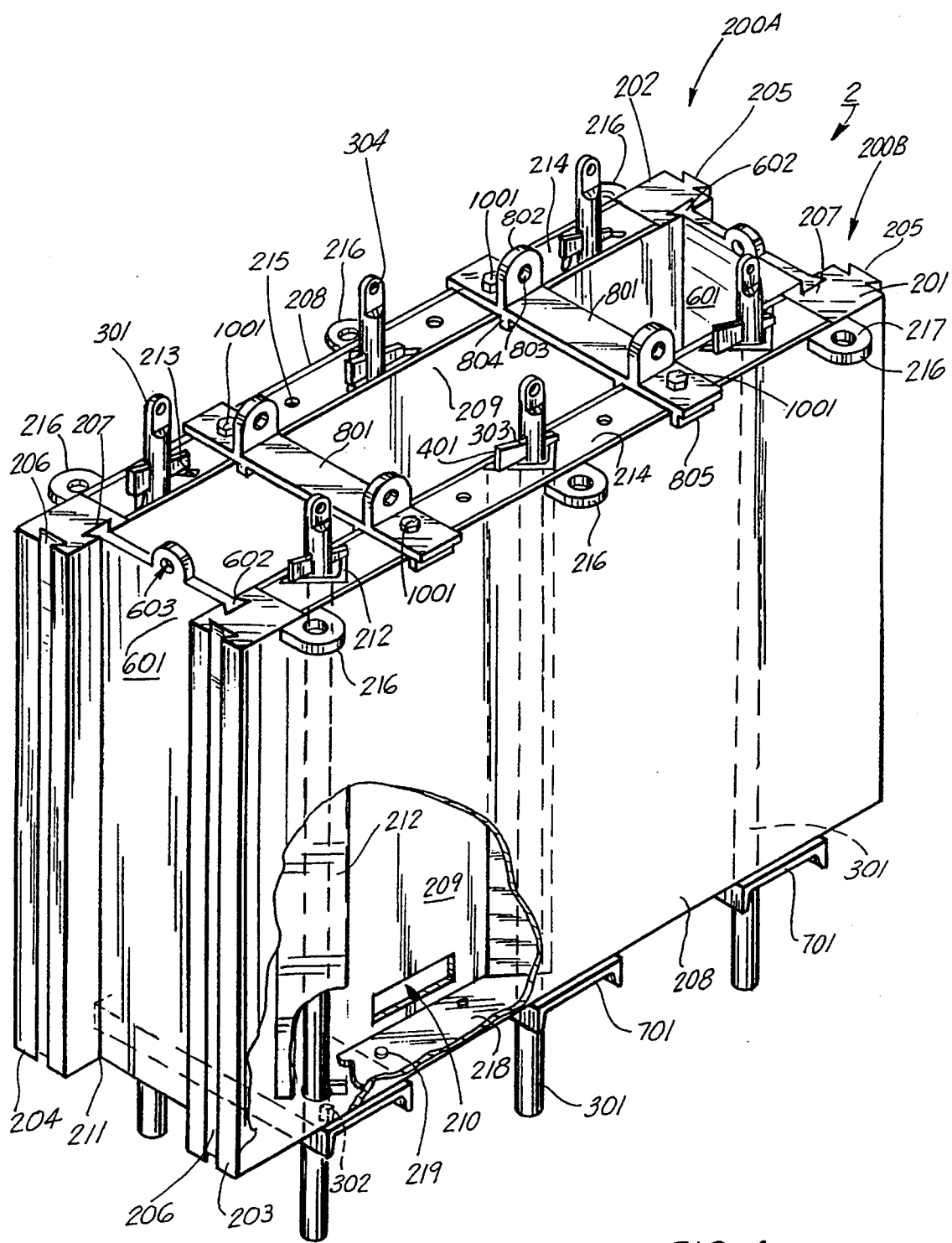
FIG. 4 is a perspective view, partially cut away, of a first, exemplary guide box assembly of a type which can be used in the present invention, with all of its parts fully assembled together but without any barrier member contained within it.

As can best be seen in FIG. 4, a first, exemplary embodiment of the guide box assembly includes two, like, opposed, parallel, vertical wall panels 200A & 200B having a mortise and tenon connector 201 for the right-hand wall panel & another, like mortise and tenon connector 202 for the left-hand panel, and a double mortise connector 203 for the right-hand panel & a like double mortise connector 204 for the left-hand panel. To provide male/female, interconnecting joint elements, the wall panels have two, flanking connector tenons 205 at one end and two, flanking connector mortises 206 for mating with connector tenons (like 205) of another, adjacent panel at the other end, respectively.

Opposed, laterally directed, connector mortises 207 are provided on the interior ends of the wall panels 200 for mating with gate tenons 602 on laterally extending, end gates 601. The gates 601 in combination with the wall panels 200 define an enclosed, protected space into which appropriate barrier members can be placed, isolated and protected from any incursion of dirt or other debris from the surrounding ground.

Each gate 601 also includes a gate lifting-eye 603 to allow for its easy removal from the wall panels 200 when so desired. Thus, the two, laterally disposed, end gates 601 are slidingly engaged between the wall panels 200 at their longitudinally spaced ends, closing off their longitudinal spaced ends, with each gate having a width great enough to accommodate the lateral thickness of a barrier member.

If so desired, a series of oppositely opposed holes (not illustrated) can be provided in the sides of each gate 601 spaced along its vertical height at least in its upper portion. With the use of locking or stop pins, which are placed in selected ones of the opposed holes in the sides of the gate, the gate would be allowed to be only partially inserted into the wall panels 200 down a desired distance.

Each wall panel 200 includes an outer skin 208 forming an interior wall surface and a parallel, inner skin 209 forming an interior wall surface, which includes through it a series of hand access openings 210, allowing easy access to the inside of the panel for ease in, for example, bolting and unbolting various items which might be connected to the underside of the panel. A bottom gate stop 211 is provided on the bottoms of the wall panels 200 at least in the areas underlying the female mortises 206. When a series of vertically stacked and connected panels 200 are incorporated in a stacked configuration (not illustrated), the gate stop 211 is installed only on the lower most panels.

Figure 6:
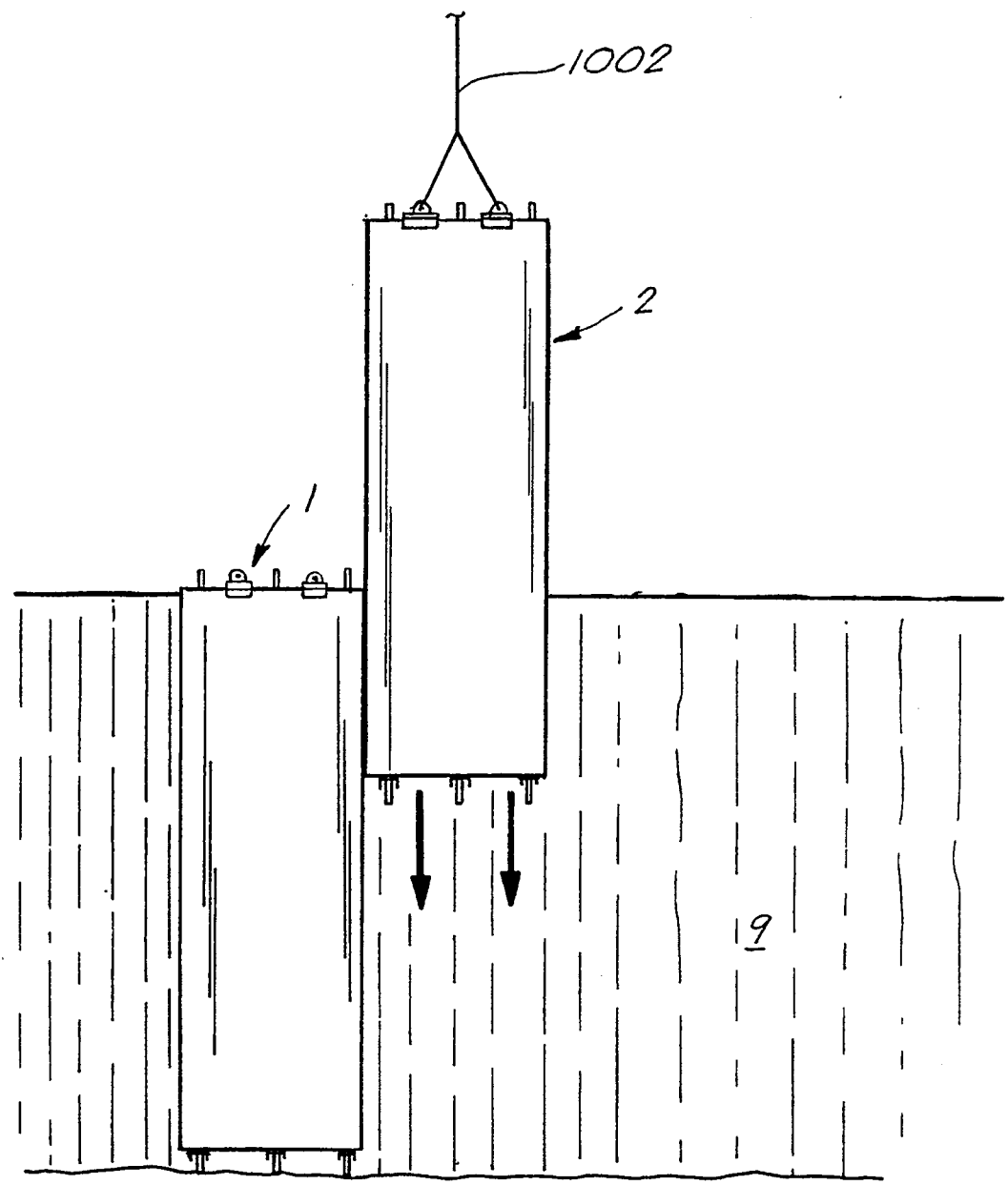
FIG. 6 is a side view of the step illustrated in FIG. 5

A series of vertically extended, structural, angle irons 212 are included in each wall panel 200, each one serving as a vertically extended, structural member and as a guide slot for a vertically disposed guide shaft 301 having a guide shaft dog 302 at its bottom area (see also FIG. 6 of the parent Ser. No. 07/07/985,944). Each angle iron element 212 provides a guide slot 213 for its respective guide shaft 301 and its guide-shaft-dog 302.

To complete the basic wall panel structure, an upper, longitudinally extended, stiffener/mounting plate 214 and a lower, longitudinally extended, stiffener/mounting plate 218, are provided affixed to the outer and inner skins 208, 209, respectively, with the stiffener plates being welded to the structural angle iron members 212 and with each plate having a series of mounting holes 215, 219, respectively, spaced along its respective, longitudinal length for use in, for example, bolting together a series of vertically stacked panels for a containment wall of a height greater than the height of a single wall panel 200. Thus, the guide box assemblies can be provided in a variety of standard heights, with greater heights being achieved by bolting together appropriate ones of two or more individual wall panels using the upper and lower bolt holes 215/219 to bolt an upper one to a lower one. Hence, for example, two sets of ten (10') foot height panels 200 could be bolted together to install a twenty (20') foot height containment wall.

The upper holes 215 (on the top two panels) are also used to affix by bolting sets of rigid, spacing and lifting bars 801, which are made of, for example, steel, and laterally extend across from one wall panel 200A to the other 200B. Each bolting unit 1001 typically would include a bolt, nut, and two washers.

At the top of each panel 200 are affixed aligning and plumbing clips 216 provided along the panel's length, each of which includes a hole 217 for easy attachment of a standard cable and ratchet assembly (not illustrated).

Figure 7:
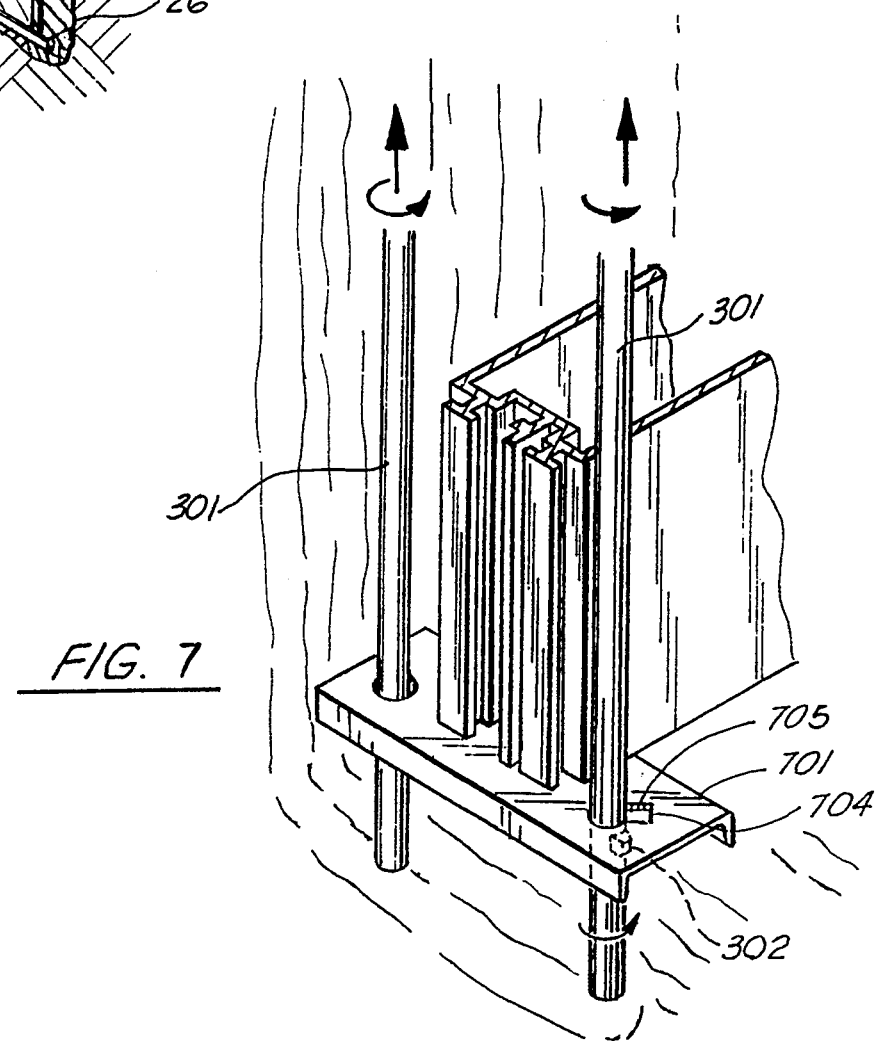
FIG. 7 is a perspective view, with the surrounding dirt and the adjacent barrier member cut away for purposes of illustration, showing the removal of the two, end guide shafts from the keyed holes of the spacer plate at one end of a guide box assembly, with the side walls of the assembly having already been removed, leaving the spacer plate under the barrier member in place in the ground.

As can be seen in FIG. 4, a guide shaft 301 is positioned in each one of the guide slots 213 with its bottom end extending through and locked into a respective one of a series of laterally extending, rigid, anchoring, spacer plates 701 made of, for example, steel. As can be seen in FIG. 7, each spacer plate 701 includes two circular holes 703, each with a key-way, radial slot 704 in it, designed to allow the passage of the radial lug or dog 302 on a guide shaft 301 through it. Once the dog 302 has passed through the key-way slot 704 and the shaft 301 appropriately rotated, the bottom end of the shaft is locked into its respective anchoring spacer plate 701. By reversing this action, i.e., oppositely rotating it, the shaft can be unlocked from the spacer plate.

An upper slot 303 is provided in the top end of each guide shaft 301, into which a tapered, "draw-up" plate 401 is driven. This causes its respective guide shaft 301 to be drawn up in its respective slot 213 until the respective spreader plate 701 to which the shaft is locked bears up against the bottom stiffener plate 218. When this is done for all six shafts 301 and the upper spacers 801 are bolted in place, the two panels 200 are relatively tightly assembled together in a rigid assembly unit and moveable around as an integral unit under the lifting action and control of, for example, a crane. The guide box assemblies, when fully assembled, are free standing, rigid and self-supporting.

Each spacer and lifting bar 801 includes a lifting-pad 802 with a lifting-pad eye 803, to which a crane cable and cradle assembly 1002 (see FIG. 2) can be easily attached. Each spacer bar 801 also includes, on its bottom, opposed sets of inner spacing shoulders 804 and outer spacing shoulders 805 for fitting about and holding between them the wall panels 200.

If so desired, a series of (or one continuous) longitudinally and downwardly extended, lateral-shift-preventing plate(s) (not illustrated) could be bolted or otherwise attached to the bottom of the stiffener plate 218. Such a lateral-shift-preventing plate would then be tapped down into the ground when the guide box assembly is placed into a trench into the ground for stability and anchoring purposes.

Figure 5:
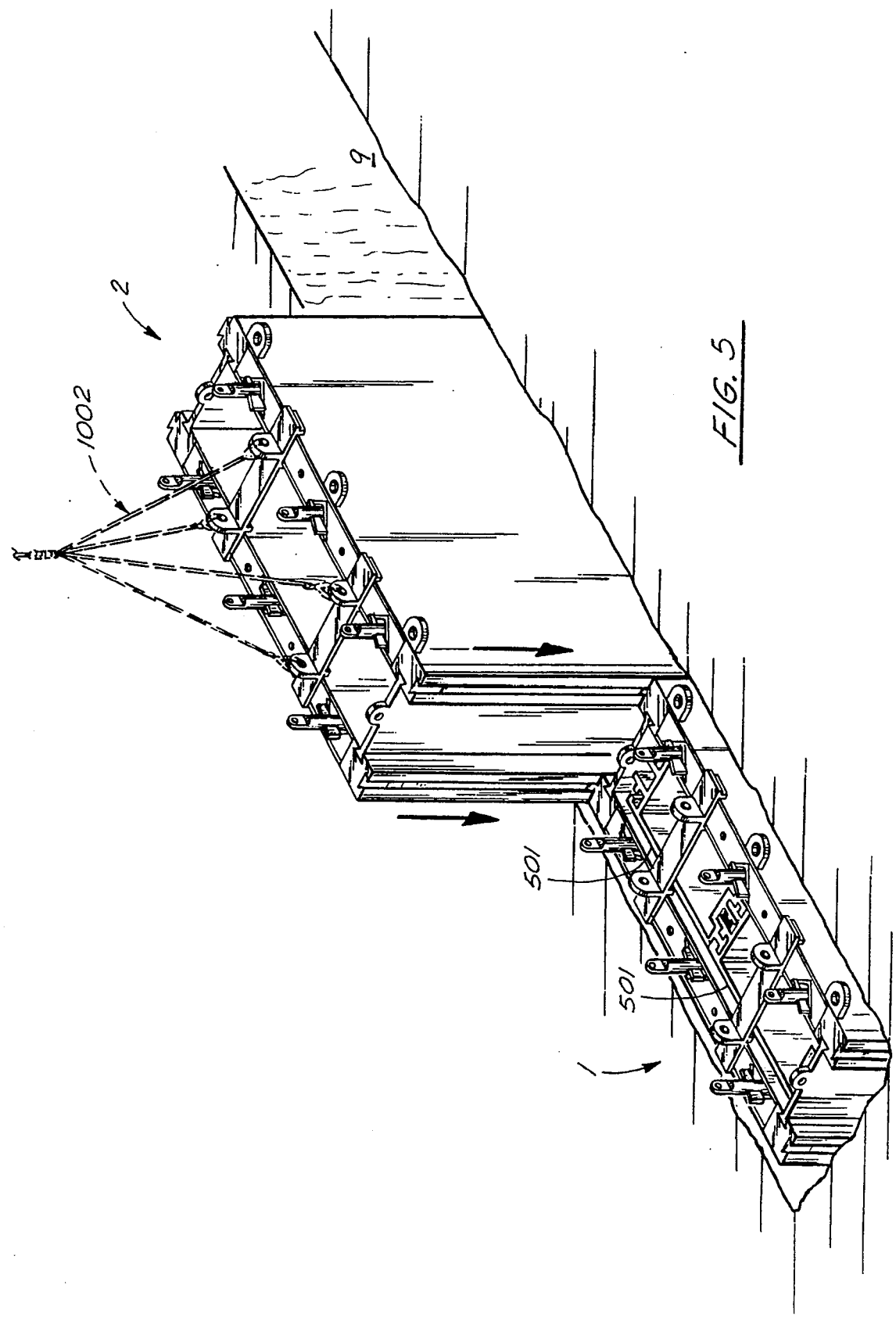

The foregoing described, initial embodiment of the guide box assembly of the present invention can be used to install, for example, a containment wall made up of the type of double wall barrier members 501, which can be seen in the initial guide box assembly unit (unit to the left in figure) shown in FIG. 5 and illustrated and further described in some detail in FIG. 5 of the parent application Ser. No. 07/985,944. This double wall barrier member 501 is also described in some greater detail in the pending, incorporated application Ser. No. 07/986,241 of Breaux & Sansone (note particularly the embodiment of FIG. 10).

These basic barrier wall elements 501 can be made of, for example, extruded thermoplastic made in the desired heights for the barrier members, e.g., ten (10'), fifteen (15') and twenty (20') foot heights. Barrier members 501 employing the same design are included on the opposite sides interconnected together to form a complete barrier of the size and configuration desired.

In order to prevent passage of fluid through the joint between barrier members, an elastomeric gasket preferably of the type known as U-packing (shown in a close-up view in FIG. 11 of the Breaux/Sansone application in its "natural," un-compressed state), is placed in the side cavity formed between adjacent barrier members between their respective, mating male and female members. As noted above, the elastomeric material chosen for the gasket depends on the fluid being retained, with, for example, buna-n rubber being very suitable for water, but vinylidene fluoride hexaflouropropylene copolymer (e.g. "Viton" TM), for example, being preferred where corrosive chemicals are involved.

2ND EMBODIMENT OF GUIDE BOX ASSEMBLY & BARRIER MEMBER (FIG. 9)

An additional, currently more preferred, exemplary embodiment will now be described with reference to FIG. 9, including second, exemplary embodiments of the guide box assembly and barrier member. However, for the sake of brevity, because many of the elements are the same or analogously the same (in which case analogous reference numbers were used), a description of all of them will not be provided to avoid redundancy.

Figure 9:
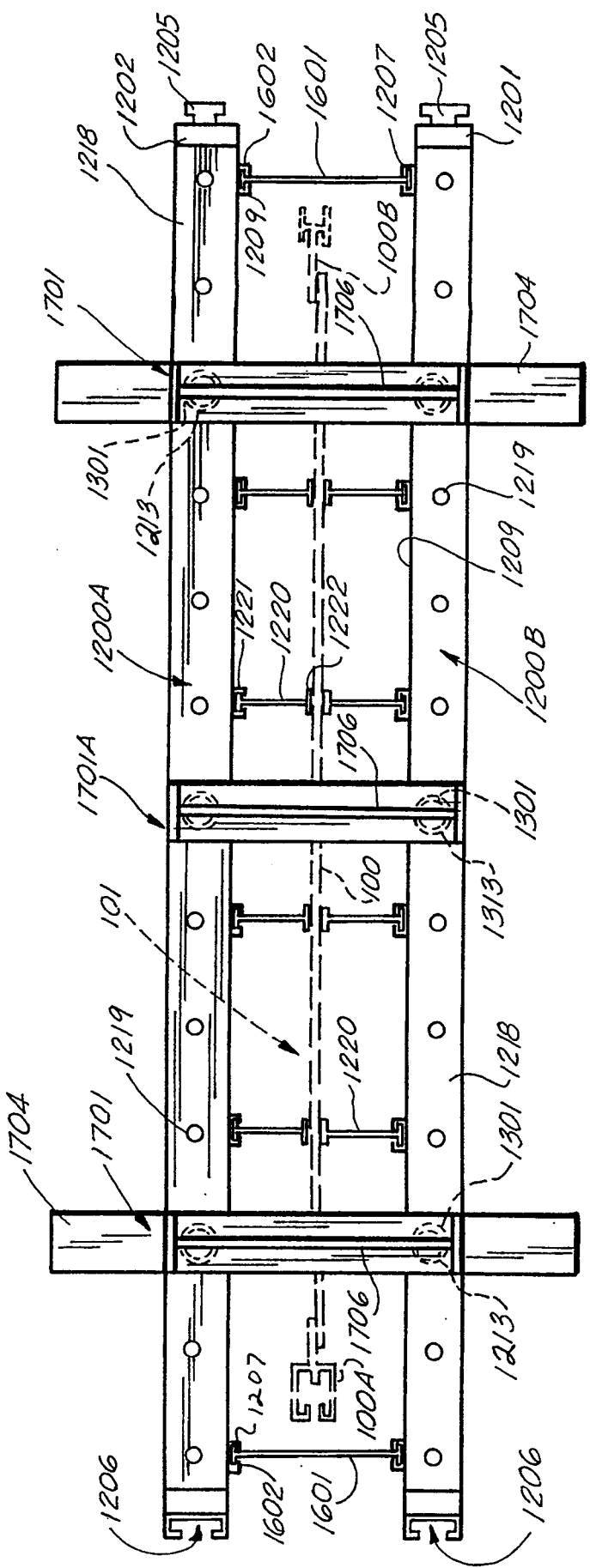
FIG. 9 is a bottom view of an alternate embodiment of the guide box assembly with an alternate embodiment of the barrier member of the present invention, both of which are currently preferred embodiments.

As can be seen in FIGS. 9, a second, currently more preferred embodiment 101 for the containment barrier member of the present invention includes a rectangular, single-wall, flat, main body sheet or section 100, which is assembled and joined together into a continuous, integrated in-ground, containment wall W with other like barrier members (see FIG. 1) by means of interlocking members 102 and 104.

The main body 100 includes two, connected coupling end pieces 100A & 100B affixedly connected at heat fused areas. All three of these basic barrier wall elements can be made of, for example, extruded plastic made in the desired heights for the barrier members 101, e.g., ten (10'), fifteen (15') and twenty (20') foot heights. Exemplary plastic material for the barrier member 101 are medium (e.g. 0.934 g/cc density, ASTM) polyethylene or high density polyethylene (density great than 0.939 g/cc) polypropylene or possibly polyvinyl chloride (PVC) or other material inert to the materials to be confined by the barrier wall W or other thermoplastic material.

Adjacent barrier members 101 employing essentially the same design (or an analogous design for a corner unit) are included on the opposite sides interconnected together to form a complete barrier of the size and configuration desired. This design preferably provides an interlocked joint (100A/100B, 102/104) having essentially the same as or greater strength than the main body member 100.

As further shown in the bottom view of FIG. 10, the two, bottom, spreader, base plates 1701 toward the ends of the panels 1200 can include centering, stabilizing wings 1704, while the center spreader plate 1701A can be of a simpler design.

Also, rather than use the tapered draw-up plates 401 to secure the upper ends of the steel guide shafts 301 to the upper stiffener plate 214, both ends of the steel shaft 1301 can include internal, female threaded ends 1302, allowing the use of a relatively simple bolt/plate securing arrangement (not seen in the drawings) to quickly and easily secure the upper ends of the shafts 1301 to their respective upper stiffener plate.

In order to give interim lateral support to the relatively thin, single wall structure of the barrier members 101, a series of laterally extending, insert beams 1220, each inserted at one end between two angle iron members forming a channel 1221 attached to the interior sides 1209 of the panels 1200, are included with the wall panels of the guide box assembly. The distal, "T" ends 1222 of the beams 1220 bear up against the sides of the main body 100 of the barrier member 101, providing it with lateral support (to minimize barrier wall deflection) until back-fill material is added into the interior of the guide box assembly.

Thereafter the insert beams 1220 can be removed, either separately or in combination with the main body panels of the guide box assembly, leaving the interconnected, single-wall barrier member(s) vertically in place, stabilized by back-fill. The lateral extent of the opposed insert beams, which of course determines the size of the gap (e.g. a one and half inch gap to laterally support the barrier body 100) formed between them, will depend upon the thickness of the barrier members to be installed within the guide box assembly(ies), and different sets of laterally supporting, insert beams having different widths can be used with the same basic guide box assemblies to accommodate different wall thicknesses of barrier members.

It is noted that the main wall section 100 of the barrier member 101 is not totally rigid and does have some flexibility and can partially deflect under its own weight due to its single wall construction and relatively thinness, and hence some interim lateral support is desirable. On the other hand, such single wall construction typically is not like the membrane or relatively very thin, sheet-type material of the prior art which can, for example, be inflated or provided in rolls and basically have no capability of standing up on their own.

METHOD OF INSTALLATION (FIGS. 5+)

As can be seen in FIGS. 5+, the initial steps in an exemplary embodiment of the containment wall installation methodology of the present invention is illustrated, in which a series of like barrier members 501 of the type of FIG. 5 are ultimately interconnected and installed in the ground using guide box assemblies of the type of FIG. 1.

Initially a trench 9 or other appropriate excavation opening is dug. The excavation of a trench 9 for installation of a containment wall W (as taught in FIG. 1 of the '233 "grandparent" patent) without a guide box assembly may be satisfactorily implemented in areas with highly cohesive soils, but typically will not be satisfactory where the soil has a very high moisture content, is sandy or otherwise likely to "cave". Thus, the guide box assembly method of installation of the invention typically will be used where soil caving is likely to be a problem. The guide box assembly method of the invention is critical in such situations, as the excavation may have to be as deep as, e.g., forty (40') feet, and the hole should be "clean" prior to the in-ground installation of the vertical barrier members 501 (101). Additionally, when a single-wall-type barrier member 101 is used, direct lateral support of the sides of the barrier member along its vertical extent is highly desirable, if not essential, in order to keep the relatively thin main wall body 100 of the barrier member from curving and becoming out-of-line and/or out-of-plumb.

Loose sand, gravel, or the like can interfere with the engagement of the barrier members 501 (101). Further, debris forming at the bottom of the hole during installation may tend to prevent communication of the barrier with the clay strata, thereby allowing migration of the contaminant between or below them. It is for these reasons that the guide box assembly method of installation of the invention was developed and is particularly suitable for such situations.

As noted above, the methodology of installation of the invention is illustrated in FIGS. 4+ and comprises the utilization of the "guide box" assembly or apparatus referred to supra in connection with the discussion of FIG. 4. As can be seen in FIGS. 5 & 6, initially a trench 9 is dug (using, for example, a back-hoe type of implement), having an exemplary width of about forty-two (42") inches and a depth of about ten (10') feet, or of whatever depth is needed to reach, preferably, an underlying layer of fluid impermeable material (e.g. clay layer 20). Alternatively, the soil could be augured out, as detailed in the grandparent '233 patent.

A starting guide box assembly 1, completely assembled together as shown in FIG. 4, is positioned in the beginning of the trench 9, it being noted that both gates 601 are closed. The box assembly is generally centered (using, for example, the wing elements 1704/1705) and then more exactly centered and plumbed to exactly vertical and fixed in position at the top with temporary braces extending from the top areas of the wall panels 200 (1200) to the ground adjacent to the trench 9.

The exterior walls of the assembly are typically spaced from the side walls of the excavation, and the guide box assembly also is preferably tapped down into the underlying impermeable strata 20, using, for example, the underside of the bucket of the backhoe, causing the base spreader bars 701 (1701) to be driven down into the underlying strata, initially anchoring the base spreader bars and hence the connected main body of the box assembly in place (note FIG. 13). Some initial back-filling 26 can be added to the bottom of the trench 9 to laterally stabilize the bottom of the box guide(s) between the bottom areas of its exterior side walls 208 (1208) of the wall panels and the bottom areas of the side walls of the trench.

Then, a second, completely assembled, guide box assembly 2 is interconnected through the male/female interconnecting joint 205/206 to the initial or starting guide box assembly 1 and lowered down into the trench 9, with the joint elements interconnected and being slid down with respect to each other until their bottoms and tops are co-extensive, using a crane holding the second box assembly by means of a cable carriage 1002.

Then a third, fully assembled guide box assembly 3 is in like fashion interconnected to box assembly 2 and lowered down into the trench 9 until an interconnected series of box assemblies 1-3+, such as that generally shown in FIG. 6, is created. This process is sequentially repeated, using straight or corner boxes as needed, until ultimately the complete circuit needed for the containment wall W is completed.

As this process of sequentially adding in-line, box assemblies continues, barrier members 501 (101) are added into the interior spaces or longitudinal slots provided by the interconnected guide box assemblies 1+. If need be, one or more of the upper spreader bars 801 can be unbolted and removed (or moved to another location and re-bolted) to allow any needed access to the interiors of the boxes for insertion of the barrier members. Typically, the initial or starting box 1 will already include a barrier member, as illustrated in FIG. 5 (for simplicity of illustration it is not shown in FIG. 4). In the embodiment of FIG. 9 the insert beams 1220 provide lateral support to the main bodies 100 of the barrier members 101 along their full heights.

This barrier member insertion and assembly can commence once at least two or more box assemblies have been interconnected in the trench 9. Once the boxes 1+ have been interconnected, the interior gate(s) 601I, i.e. those gates not at the very ends (cf. 601E) of the line of box assemblies, can be lifted out, allowing the next barrier member 501 (101) to be interconnected to the preceding barrier member through their respective sealed, male/female joint elements.

To remove a gate 601, a cable is merely connected to its eye 603, and the gate is then merely lifted up out of the assembly using, for example, a crane or cherry picker or the like.

The interconnected box assemblies 1+ thus provide a "clean," isolated, temporary, work space devoid of dirt or debris for inserting and interconnecting the barrier members 501 (101) completely isolated from the surrounding ground. In similar fashion to interconnecting and lowering the box assemblies, the male/female joint elements 509/510 & 502/502' (109/110 & 102/104) on the barrier members are initially aligned and then engaged as one member is lowered down with respect to the preceding member.

Figure 8:
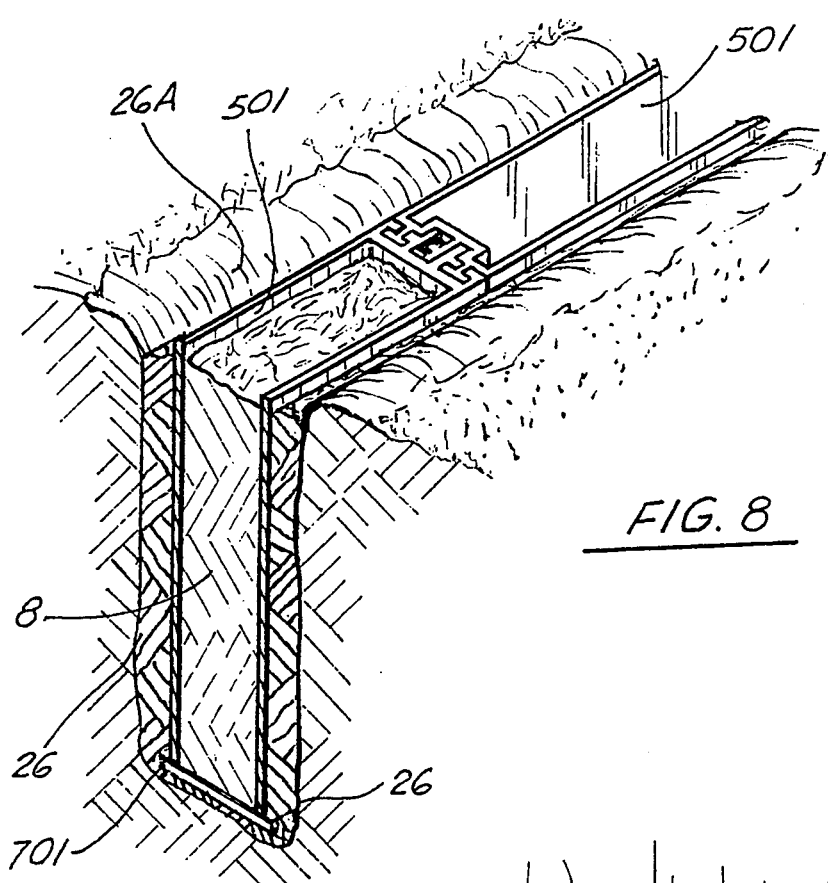
FIG. 8 is a perspective, cut-away view showing the interconnection between two, installed barrier members of a first, double wall type, with the closer one filled with material and with the side areas on the outside of the barrier members also filled with preferably the excavated material from the trench.

After the barrier members 501 (101) are slidingly engaged in place within the protected work space provided by the interconnected box assemblies 1+, the hollow cores or interiors 6 of the interconnected barrier members 501 are thereafter filled with sand or other granular material or back-fill 8 (note FIG. 8). Additionally, if so desired, a bottom sealing layer 25 of impermeable, sealing material, such as, for example, bentonite, is added to the bottom of the trench 9 before the back-fill 8 to a depth of, for example, twelve (12") or eighteen (18") inches or more, embedding the lower portion of the barrier members 501 (101), as well as further embedding the anchoring plates 701 (1701), into sealing engagement with the underlying impermeable strata 20.

Ultimately the rest (26A) of the excavation 9 surrounding the wall structure in the area(s) in which the barrier members 501 (101) have been installed is then filled, preferably with the material excavated to form the trench 9 or other selected material. This procedure can be done just after a series of boxes have been placed and set into the trench 9 but only partially back-filled (26) to prevent any movement of the bottoms of the boxes, which had provided sufficient stability to the boxes.

Likewise the areas between the interior walls 209 (1209) of the wall panels 200 (1200) and their respective barrier member(s) 501 (101) are filled with back-fill or other selected material. However, complete back-filling for an installed box and its contained barrier member(s) should not occur until at least the very next box assembly and its barrier member(s) have been put in place, and, if some back-filling has gotten over into an area in which a guide box assembly or barrier member(s) still need to be placed, some preliminary, trench bottom clean-out may be necessary.

It is noted that the barrier members 501 (101) are not necessarily completely covered over when the system is implemented, and it may be desirable to have the barrier wall W protrude up out of the ground so as to prevent water runoff from the surface to other areas, as the runoff may contain contaminants as well. The top of barrier members 501 may also be capped, if so desired, to prevent the filling of the cores 6 with water, as such could result in cracking or breakage of the structure if the contained liquid were to be frozen and thus expanded to form ice.

As the assembly of interconnected box assemblies 1+ and interconnected barrier members 501 (101) continues and the barrier members appropriately stabilized with fill, the previously used box assemblies can be removed and reassembled and re-used down the line. An exception to the removal of the guide box assemblies 1+, is those used to form the adjacent satellite work/equipment area E, which are preferably left in the ground.

To remove the guide box assemblies which are not to be left in the ground, the tops of the guide shafts 301 (1301) are disconnected from the tops of the wall panels 200 (1200), and any remaining upper spreader bars 801 preferably are unbolted and removed. The wall panels are then pulled up with the use of a crane or picker out of the trench 9 (now at least partially and preferably completely refilled), leaving the guide shafts still locked to the bottom spreader and anchoring plates 701 (1701). Once the wall panels 200 (1200) clear the top of the shafts 301 (1201), the main part of the guide box assembly separates into the two, separated and disconnected wall panels 200 (1200), with the bottom spreader bars 701 (1701) remaining down in the bottom of the filled trench and the upper spreader bars 801 having been preferably removed.

As a final step in the removal of a box assembly, the lower ends of the guide shafts 301 (1301) are unlocked or disengaged by appropriately rotating them, and they are then pulled up out of the at least partially filled and typically fully filled trench, leaving the interconnected barrier members 501 (101) in place resting on the bottom anchoring plates 701 (1701). The parts of each guide box assembly are then reassembled, using new anchoring, spreader plates 701 (1701), and re-used down the line as further needed to form the complete containment wall W.

Thus, after the installation of the various barrier members 101 (501) is completed, as can be seen in the simplified, generalized FIG. 1, the exemplary embodiment of the general containment system W and the adjacent work/equipment area W' are formed. Thus, as should now be understood, the containment wall W and work/equipment area wall W' include a series of interconnected, adjacent, associated barrier members 1 slidingly engaged to form subterranean, vertical, sealed barrier walls W & W'. The barrier walls W & W' stand on and penetrates an underlying, impermeable strata (e.g. clay), the barrier wall W in combination with the impermeable strata isolating the ground and its contents G, which can include, for example, toxic wastes, from the surrounding areas A. The vertical height of the containment and protective walls W & W' may be of the order of five to forty (5–40') feet or more, depending on the depth of the underlying impermeable layer.

If desired, special guide box assemblies could be used for the protective wall W' for the work/equipment area E, since they preferably left in the ground after the barrier walls are formed. Such special guide boxes could have their parts fully permanently attached together to be left down in the ground after the barrier wall has been formed, with, for example, the pass-through pipe sections 900 already attached to the barrier wall 1' and the guide box panel wall structures.

For a further understanding of these various types of barrier containment systems and additional ways of how they can be installed down in the ground and what are some other exemplary types of male/female joints for the barrier members that might be used, reference is had to the grandparent '233 patent and the Breaux/Sansone '241 application.

However, as discussed above, it should be understood that one barrier member 1 is preferably slid down into interconnection with the other, adjacent, preceding one, using the male/female joint and associated seals described more fully above, as part of their in-ground installation. Guide box assemblies, such as the ones described above, which temporarily isolate the barrier members 1 from the surrounding ground G/A, preferably are used to guide and hold the various, constituent, barrier members 1 as they are interconnected together to ultimately form the completed containment and protective walls W & W', as all described above. If needed, lubricants can be used to assist in sliding the joint coupling and gasket elements of the barrier members 1+ with respect to one another.

As should be understood, the containment walls W & W' are implemented vertically in a mostly subterranean manner to a sufficient depth to communicate with the fluid impermeable strata 20 such as clay or the like. The fluid impermeable vertical barrier wall system, communicating with the clay strata, forms a relatively impregnable "container."

In the present example, toxic waste material 23 in a dump or the like contains contaminated fluids 24 or suspended material which may migrate through the natural soil 22 to the ground water aquifer 21 which, without containment, would increase its rate of migration out of the area, contaminating, for example, lakes, rivers, and the water supply. It should be noted that neither the aquifer 21 nor the contaminant 24 permeates the clay strata 20. Thus, the use of the present invention prevents migration of the contaminants 24 in the site, and cuts off flow of the natural aquifer 21 in the containment area.

The vertical barrier wall W, with its over-all impermeably sealed barrier 7, prevents migration of the contaminant and any tainted water in the containment site G. As noted above, in order to prevent leeching of the contaminant between the bottom of the barrier and the clay strata 20, a layer of bentonite 25 or the like may be deposited at the base of the trench prior to installation of the barrier system. Also, as noted above, to further prevent leaching under the barrier wall, the guide boxes for the barrier members preferably are "tapped" into the clay strata 20 a short distance to further seal the system into the underlying strata.

Although the preferred application for the present invention is the containment of fluid wastes overlying a fluid impermeable strata, the invention can also be applied to other fields or applications such as, for example, soil containment for levees, containment of solid wastes, etc.

It is noted that the embodiments described herein in detail for exemplary purposes are of course subject to many different variations in structure, design, application and methodology. Because many varying and different embodiments may be made within the scope of the inventive concept(s) herein taught, and because many modifications may be made in the embodiments herein detailed in accordance with the descriptive requirements of the law, it is to be understood that the details herein are to be interpreted as illustrative and not in a limiting sense.

I claim:

1. A method of producing an in-ground lateral containment barrier system, preventing the lateral migration of fluid contaminants in an area in the ground, while allowing controlled removal of some of the fluid contaminants from the contained area, comprising the following steps:

a. making an excavation around the area to be contained;

b. forming a fluid impermeable barrier wall in the ground around the contaminants by placing a series of elongated barrier members within the excavation and slidingly engaging and interconnecting them in a vertical manner, connecting them together, including the sub-steps of:

i. placing a first guide box assembly, having at least one longitudinal slot formed therein of a width to accommodate a barrier member, in the excavation, ii. placing a subsequent series of guide box assemblies in the excavation adjacent to a preceding one of said guide box assemblies, each guide box assembly having at least one longitudinal slot formed therein of a width to accommodate a barrier member, the interiors of said series of guide box assemblies forming a continuous, open area communicating with said slot of said first guide box assembly, providing a temporary, open, protected work space for the insertion and assembly of the barrier members in the longitudinal slots of respective ones of said guide box assemblies, iii. inserting a first barrier member in the longitudinal slot of said first guide box assembly, and iv. slidingly engaging and connecting together, in longitudinal fashion, a further series of barrier members to said first barrier member in the temporary, open, protected work space formed by said guide box assemblies, forming a fluid impermeable barrier in the ground;

c. including a restricted, piped, pass-through through at least one of said barrier members, allowing the controlled removal of some of the fluid materials in the contained area through said pass-through; and d. filling the excavation with material, laterally containing the contaminated area with the fluid impermeable barrier members, and ultimately removing at least the main structure of at least some of said guide box assemblies from said excavation.

2. The method of claim 1, wherein there is further included the steps of:
repeating sub-steps "b-ii" and "b-iv" until the barrier wall has been completed and the fluid contaminants have been encircled.

3. The method of claim 1, wherein there is further included the steps of:
repeating sub-steps "b-ii" and "b-iv" until a further, supplemental, encircling barrier wall adjacent to but generally isolated from the fluid containment has been completed, providing a protected, satellite work/equipment area for the treatment in situ of contaminated fluids from the contained area.

4. The method of claim 3, wherein there is further included the steps of:
leaving the guide box assemblies surrounding said work/equipment in the ground after the barrier walls have been completely formed.

5. The method of claim 4, wherein there is further included the steps of:
excavating the material from the encircled work/equipment area forming an open, submerged cell.

6. The method of claim 5, wherein there is further included the steps of:
installing a series of spreader beams extending across and between opposed walls forming the encircled work/equipment area as part of the excavation step of claim 5, stabilizing said opposed walls.

7. The method of claim 1, wherein there is further included the steps of:
repeating sub-steps "b-ii" and "b-iv" until a supplemental, encircling barrier wall adjacent to but generally isolated from the contained area has been completed, providing a protected, satellite work/equipment area for the treatment in situ of contaminated fluids from the contained area, with the two adjacent areas sharing a common barrier wall and with said pass-through being located in said common barrier wall.

8. The method of claim 1, wherein at least some of said guide box assemblies includes two, spaced wall panels, each having an interior wall defining between them said work space and each having an exterior wall; and wherein there is further included in step "b" the steps of:
placing said guide box assemblies in the excavation with space between the exterior walls of said wall panels and the sides of said excavation with at least the one to contain a barrier member with an integral pass-through having open, pass-through areas in the walls of the guide box assembly adjacent to said pass-through in said barrier member; and after the guide box assembly with the pass-through areas has been installed in the ground, excavating the material around said pass-through areas and said pass-through exposing said pass-through, and connecting pipe sections to both sides of said pass-through through said pass-through areas, allowing fluid material to be passed through said pass-through from the contained area.

9. The method of utilizing a guide box assembly system for defining a protected, open, work space for installing and interconnecting, in-ground barrier members in an excavation to form a contaminant containment and processing site, comprising:
a. excavating a lateral trench about the area to be contained of sufficient depth to interface with an underground, fluid impermeable strata;
b. providing a guide box, comprising two, spaced, rigid, connected, wall panels, each having a top and a bottom and each having an interior wall defining between them the protected, open, work space of a size to accommodate a barrier member, and each having an exterior wall, said wall panels each having a pass-through area adjacent to the location of the pass-through of the barrier member when positioned in the assembly, said guide box being held together as a rigid, assembled unit by means of laterally extending, rigid, spaced, top, spacer bars attached across the top portions of said wall panels and at least two, laterally extending, rigid, spaced, bottom, spacer bars attached across the bottom portions of said wall panels;
c. placing said guide box in said trench;
d. providing a barrier member with a pass-through area formed therein;
e. placing said barrier member in the work spaced formed within said guide box;
f. aligning said barrier member within said work space such that the pass-through area formed in said barrier member is generally aligned with the pass-through areas formed in said wall panels of said guide box;
g. placing fluid conveyance means for conveying fluid through said pass-through areas formed in said wall panels of said guide box; while
h. placing said fluid conveyance means for conveying fluid through said pass-through area formed in said barrier member.
i. fluidly sealing the exterior of said fluid conveyance means to said barrier member.

10. The method of claim 9, wherein step "i" includes the additional step of utilizing a flanged structure with ends to which said fluid conveyance means can be easily attached through said pass-through areas in said wall panels.

* * * * *

UNITED STATES PATENT AND TRADEMARK OFFICE
CERTIFICATE OF CORRECTION

PATENT NO. : 5,354,149
DATED : Oct. 11, 1994
INVENTOR(S) : Louis B. Breaux

It is certified that error appears in the above-indentified patent and that said Letters Patent is hereby corrected as shown below:

On the title page: Item [73], after "Assignee:"; delete "Barrier Member Containment Corp., Gretna, La".

Signed and Sealed this

Twenty-second Day of July, 1997

Attest:

BRUCE LEHMAN

Attesting Officer

Commissioner of Patents and Trademarks